(12) United States Patent
Luik et al.

(10) Patent No.: US 9,346,103 B2
(45) Date of Patent: May 24, 2016

(54) TOOL FOR THE MACHINING OF A WORKPIECE WITH LATERAL COOLANT OUTLET

(71) Applicants: HARTMETALL-WERKZEUGFABRIK PAUL HORN GMBH, Tuebingen (DE); ERNST GRAF GMBH, Dietingen-Böhringen (DE)

(72) Inventors: Matthias Luik, Reutlingen (DE); Edgar Fuchs, Böhringen (DE)

(73) Assignees: HARTMETALL-WERKZEUGFABRIK PAUL HORN GMBH, Tuebingen (DE); ERNST GRAF GMBH, Dietingen-Bohringen (DE)

( * ) Notice: Subject to any disclaimer, the term of this patent is extended or adjusted under 35 U.S.C. 154(b) by 278 days.

(21) Appl. No.: 14/038,084

(22) Filed: Sep. 26, 2013

(65) Prior Publication Data

US 2014/0030033 A1    Jan. 30, 2014

Related U.S. Application Data

(63) Continuation of application No. PCT/EP2012/055437, filed on Mar. 27, 2012.

(30) Foreign Application Priority Data

Mar. 28, 2011 (DE) .......................... 10 2011 016 148

(51) Int. Cl.
*B23B 27/00* (2006.01)
*B23B 27/10* (2006.01)
*B23B 29/04* (2006.01)

(52) U.S. Cl.
CPC .............. *B23B 27/10* (2013.01); *B23B 29/043* (2013.01); *B23B 2205/02* (2013.01); *Y10T 407/14* (2015.01)

(58) Field of Classification Search
CPC ........ B23B 27/10; B23B 51/06; B23Q 11/10; B23C 5/28
USPC ........................................................... 407/11
See application file for complete search history.

(56) References Cited

U.S. PATENT DOCUMENTS 4,072,438 A    2/1978  Powers
4,131,383 A    12/1978 Powers (Continued)

FOREIGN PATENT DOCUMENTS

DE    27 33 705      2/1978
DE    101 32 721     1/2003

(Continued)

OTHER PUBLICATIONS

Japanese Office Action, Application No. 2014-501581, dated: Jan. 29, 2015.

(Continued)

*Primary Examiner* — Will Fridie, Jr.
(74) *Attorney, Agent, or Firm* — Saliwanchik, Lloyd & Eisenschenk

(57) ABSTRACT

A tool for machining a workpiece is presented. The tool has a cutting insert with at least one cutting edge, a holder having a shank, and a cutting insert receptacle, wherein the cutting insert receptacle is arranged in a region of a workpiece-side end face of the shank, and the cutting insert is disposed in the cutting insert receptacle. The holder has a coolant bore, which opens out into a plurality of coolant outlets. The plurality of coolant outlets are arranged on the workpiece-side end face of the shank, alongside the cutting insert receptacle, and are oriented such that coolant is discharged towards the cutting insert. At least some of the coolant outlets lie in a coolant outlet plane which runs parallel to and offset from a cutting insert plane running through the cutting insert receptacle, where the coolant outlet plane and the cutting insert plane run parallel to the longitudinal direction of the shank.

15 Claims, 7 Drawing Sheets

(56) References Cited

U.S. PATENT DOCUMENTS

| | | | | |
|---|---|---|---|---|
| 5,388,487 | A | * | 2/1995 | Danielsen ............... B23B 29/04 279/2.08 |
| 5,718,156 | A | * | 2/1998 | Lagrolet ................ B23B 27/10 407/11 |
| 5,873,684 | A | * | 2/1999 | Flolo ........................ B23G 5/06 407/11 |
| 6,045,300 | A | | 4/2000 | Antoun |
| 6,312,199 | B1 | * | 11/2001 | Sjoden ................... B23B 27/10 407/11 |
| 6,443,672 | B1 | * | 9/2002 | Lagerberg ............... B23B 27/10 407/11 |
| 6,471,448 | B1 | * | 10/2002 | Lagerberg ............ B23Q 11/005 407/11 |
| 7,063,487 | B2 | * | 6/2006 | Hessman ................ B23B 27/06 407/103 |
| 8,388,268 | B2 | * | 3/2013 | Henry ..................... B23B 27/10 407/101 |
| 2002/0127067 | A1 | * | 9/2002 | Lagerberg ............ B23B 29/046 407/11 |
| 2004/0052592 | A1 | | 3/2004 | Oettle |
| 2004/0151551 | A1 | | 8/2004 | Oettle |
| 2007/0081867 | A1 | | 4/2007 | Murakami et al. |
| 2009/0311055 | A1 | * | 12/2009 | Galota ..................... B23C 5/28 407/11 |
| 2010/0178116 | A1 | | 7/2010 | Watanabe et al. |
| 2010/0272529 | A1 | | 10/2010 | Rozzi et al. |
| 2011/0052336 | A1 | * | 3/2011 | Kress ................ B23B 29/03428 407/11 |
| 2011/0070037 | A1 | * | 3/2011 | Baker .................... B23B 27/10 407/11 |
| 2012/0163931 | A1 | * | 6/2012 | Friedrichs ............... B23B 51/06 408/57 |
| 2014/0030033 | A1 | * | 1/2014 | Luik ....................... B23B 27/10 407/11 |
| 2014/0356082 | A1 | * | 12/2014 | Smith .................... B23B 27/10 407/11 |

FOREIGN PATENT DOCUMENTS

| | | |
|---|---|---|
| DE | 101 45 667 | 3/2003 |
| DE | 103 31 077 | 2/2005 |
| DE | 103 46 726 | 5/2005 |
| EP | 1 762 320 | 3/2007 |
| JP | 07-227702 | 8/1995 |
| JP | 10-094904 | 4/1998 |
| JP | 2001-524033 | 11/2001 |
| JP | 2009-125848 | 6/2009 |
| WO | WO-98/48963 | 11/1998 |

OTHER PUBLICATIONS

English translation of Japanese Office Action, Application No. 2014-501581, dated: Jan. 29, 2015.

* cited by examiner

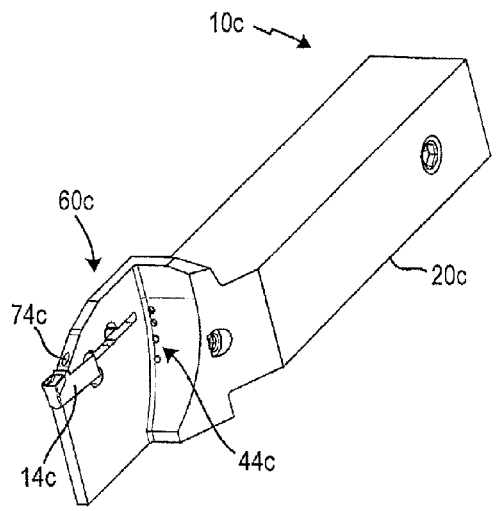
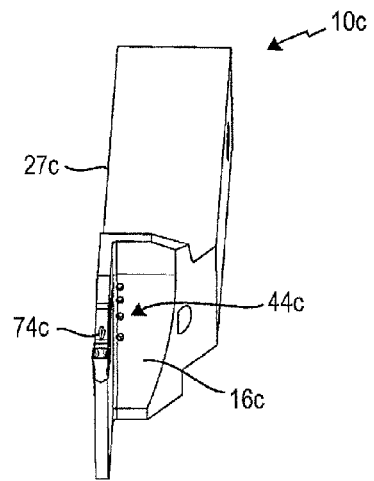
Fig. 3A              Fig. 3B
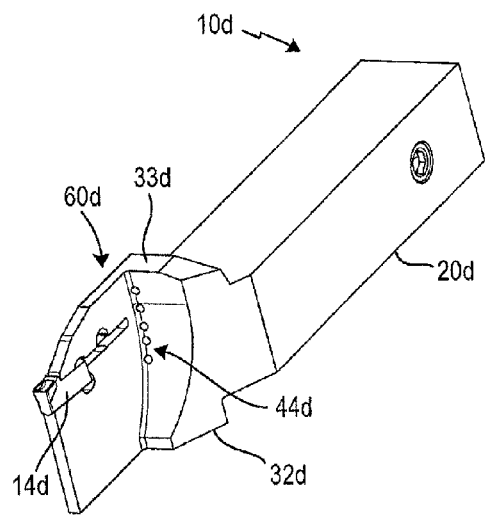
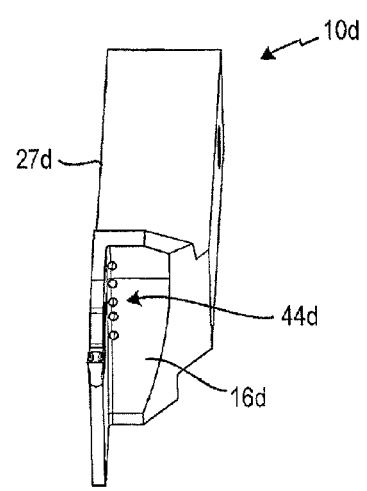
Fig. 4A              Fig. 4B

TOOL FOR THE MACHINING OF A WORKPIECE WITH LATERAL COOLANT OUTLET

CROSS-REFERENCE TO RELATED APPLICATIONS

This application is a continuation of international patent application PCT/EP2012/055437 (WO 2012/130857 A1), filed on Mar. 27, 2012 designating the U.S., which international patent application has been published in German language and claims priority from German patent application DE 10 2011 016 148.1, filed on Mar. 28, 2011. The entire contents of these priority applications are incorporated herein by reference.

BACKGROUND OF THE INVENTION

The disclosure relates to a tool for machining a workpiece. The disclosure further relates to a holder for such a tool. The disclosure relates, in particular, to the coolant guidance in such a tool or such a holder.

For the coolant guidance in a machining tool, there are a large number of solutions. Often a central coolant bore is provided in the holder in the longitudinal direction, through which coolant bore the coolant is transported from the holder-side end face to the workpiece-side end face, in particular to a cutting insert which is seated there in a cutting insert receptacle. In the region of the workpiece-side end face, the coolant is then either discharged directly from the holder through a coolant outlet or is distributed through one or more bores in the cutting insert onward to the at least one cutting edge of the cutting insert. In general, the coolant is here generally sprayed purposefully by a directed jet directly onto the at least one cutting edge and/or onto the machining point on the workpiece. Such a solution is described, for example, in DE 103 31 077 B3, in which the mouth of the cooling lubricant channel on the workpiece-side end face of the holder is disposed above the turning tool, so that the cooling lubricant jet strikes a workpiece and is so strong that it breaks a turning chip.

SUMMARY OF THE INVENTION

It is an object to provide a tool for machining a workpiece, as well as a holder for such a tool, having an alternative and improved cooling facility.

In view of this object, there is provided a tool for machining a workpiece, comprising a cutting insert with at least one cutting edge, and a holder having a shank. Said shank extends along a longitudinal direction. The holder further comprises a cutting insert receptacle, which is arranged in a region of a workpiece-side end face of the shank. The cutting insert is disposed said cutting insert receptacle. The holder further comprises a coolant bore, which opens out into a plurality of coolant outlets that are arranged on the workpiece-side end face of the shank, alongside the cutting insert receptacle, and are oriented such that coolant is discharged towards the cutting insert. At least some of the coolant outlets lie in a coolant outlet plane which runs parallel to and offset from a cutting insert plane running through the cutting insert receptacle. Said coolant outlet plane and said cutting insert plane run parallel to the longitudinal direction of the shank.

According to a further aspect, there is provided a tool holder comprising a shank that extends substantially along a longitudinal direction, and a cutting insert receptacle for receiving a cutting insert. Said cutting insert receptacle is arranged in a region of a workpiece-side end face of the shank. The holder further comprises a coolant bore, which opens out into a plurality of coolant outlets that are arranged on the workpiece-side end face of the shank, alongside the cutting insert receptacle, and are oriented such that coolant is discharged towards the cutting insert. The coolant outlets lie in a coolant outlet plane which runs parallel to and offset from a cutting insert plane running through the cutting insert receptacle. Said coolant outlet plane and said cutting insert plane run parallel to the longitudinal direction of the shank.

According to a still further aspect, there is provided a tool for machining a workpiece, comprising: a cutting insert with at least one cutting edge, and a holder having a shank and a cutting insert receptacle. The shank which extends along a longitudinal direction. The cutting insert receptacle is arranged in a region of a workpiece-side end face of the shank. The cutting insert is arranged in the cutting insert receptacle. The holder further comprises a coolant bore, which opens out into at least one coolant outlet that is arranged on the workpiece-side end face of the shank, alongside the cutting insert receptacle. The coolant bore is oriented such that coolant is discharged towards the cutting insert. Still further, the holder has a clamping rib which protrudes on the workpiece-side end face of the shank in the longitudinal direction and is configured thinner than the shank and has two clamping jaws between which the cutting insert is clamped. The shank is widened in the region of the workpiece-side end face, and the at least one coolant outlet is arranged in this widened region of the end face.

Unlike in known tools, no strong directed coolant jet is generated that is intended to influence or even break the chip, but rather the cooling is intended to be obtained by flooding of the at least one cutting edge and/or of the machining point on the workpiece. In the presented tool, the coolant is thus discharged in the direction of the cutting insert, but does not necessarily have to have a specific pressure. In the presented tool, an increased flow of coolant through the at least one coolant outlet is instead intended to be achieved. In the known tools, the flow rate, however, is generally limited, since the cross-sectional area of the normally only one coolant outlet per cutting edge (cutter) is limited in size. In the presented solution this is no longer the case, since the at least one coolant outlet is disposed on the workpiece-side end face of the shank of the holder, alongside the cutting insert receptacle, and not, as proposed, for example, in the above-stated DE 103 31 077 B3, directly above the cutting insert receptacle or in the cutting insert itself. As a result of this lateral arrangement of the at least one coolant outlet, the cross-sectional area thereof can be made enlarged in order to increase the flow rate per unit of time and thus achieve the desired flooding of the machining point.

For the enlargement of the cross-sectional area of the at least one coolant outlet, different refinements are possible. In one refinement, the at least one coolant outlet is not configured as a circular bore opening, as in the majority of known tools, but is slot-shaped. In another refinement, the coolant outlet is of circular or oval configuration, yet, where necessary, has a larger cross-sectional area than known coolant discharge openings.

The coolant bore preferably opens out into a plurality of coolant outlets, which are arranged such that the coolant is discharged in the direction of the cutting insert. For example, a plurality of coolant outlets can be disposed one above the other, alongside the cutting insert, on one or, if constructively possible, on both sides of the cutting insert receptacle. The precise number, configuration and arrangement of the coolant outlets here depends, inter alia, on the size of the cutting insert, the size and/or number of active cutting edges, the quantity of heat generated during the machining, and the desired level of flooding of the machining point; these parameters with respect to the coolant outlets are thus tailored to the concrete application.

The cutting insert is preferably of plate-like configuration, and the at least one coolant outlet preferably lies in a coolant outlet plane which runs parallel to and offset from a cutting insert plane running through the cutting insert receptacle. Preferably, the coolant outlet plane and the cutting insert plane here lie closely adjacent, side by side.

According to the configuration of the tool, in particular the arrangement of the cutting insert receptacle on the holder and the position of the cutting insert in or on the holder, the coolant outlet plane and the cutting insert plane run in relation to the longitudinal direction of the holder, which is preferably of bar-shaped configuration. While, in one refinement, the coolant outlet plane and the cutting insert plane run parallel to the longitudinal direction of the holder, and the cutting insert, in particular the at least one cutting edge of the cutting insert, protrudes in the longitudinal direction over the workpiece-side end face of the holder, the coolant outlet plane and the cutting insert plane run in another refinement transversely or obliquely to the longitudinal direction of the holder.

In a further refinement, it is provided that the holder has a shank region (also called shank) for reception in a holding unit, in particular a machine tool, and a clamping rib, as a cutting insert receptacle, disposed on the workpiece-side end face of the shank region so as to protrude in the longitudinal direction of the shank region, which clamping rib is configured narrower than the shank region and has two clamping jaws, between which the cutting insert is clampingly accommodated, wherein the at least one coolant outlet is disposed on the workpiece-side end face of the shank region, alongside the clamping rib.

In known tools having such a clamping rib, there are configurations in which a coolant outlet is disposed in a clamping jaw, in particular the upper clamping jaw on the workpiece-side end region. For this a bore through this clamping jaw is necessary, which bore is very complicated to produce. Due to the small width of the clamping rib, the through-flow of coolant, in these solutions too, is severely limited. The proposed embodiment not only circumvents this limitation, but is also markedly simpler in production terms, since, in principle, no bores are necessary in the clamping rib. However, it is not precluded that a further coolant outlet is additionally provided in at least one clamping jaw, for example in the upper clamping jaw, say in the workpiece-side end region of the upper clamping jaw, as is the case in known solutions.

Preferably the clamping rib is disposed on a marginal region of the workpiece-side end face of the shank region, so that a side face of the shank region merges smoothly into a side face of the clamping rib. As a result, a specific width of the entire tool is not exceeded, which, particularly where a plurality of tools are arranged side by side in a machine tool, is necessary due to the cramped conditions. In this refinement, the coolant outlets are then, in principle, disposed only on one side alongside the cutting insert receptacle. Alternatively, in one refinement, the shank region is widened in the region of the workpiece-side end face, so that coolant outlets can be disposed on both sides alongside the cutting insert receptacle by making use of this widened region of the end face. A particularly good flooding of the machining point with coolant is thereby achieved.

As already mentioned, in addition to the at least one lateral coolant outlet, one or more further coolant outlets can also be arranged, for example below and/or above the cutting insert receptacle. It is here also conceivable that this at least one further coolant outlet is configured such that a strong directed coolant jet is discharged, which coolant jet exerts an influence on the chip, as is the case in known tools.

Preferably, the coolant bore is disposed in the holder in the longitudinal direction, in particular if the holder is of bar-shaped configuration. That mouth of the coolant bore which is facing away from the workpiece frequently lies on that end face of the holder which is facing away from the workpiece, but can also lie on a side face of the holder. For the connection of the coolant bore and of the at least one coolant outlet, in the region of the workpiece-side end face of the holder are advantageously disposed a transverse bore, which runs transversely to the longitudinal direction of the holder and intersects the coolant bore, and at least one further connecting bore, which runs offset from the coolant bore in the longitudinal direction or obliquely to the longitudinal direction. For the precise number and arrangement of these further bores, various solutions are in principle conceivable, according to the concrete configuration of the tool as a whole. Bores which are constructively simple to produce, which bores are interconnected within the holder and are outwardly sealed off by appropriate closure elements, for example simple screws, are here preferred.

It should at this point be mentioned that the term "coolant" should here not necessarily be construed only as a means solely for cooling purposes, but rather that, according to application, the coolant is intended to be also and/or solely suitable for lubrication. If thus, in the present case, the term "coolant" is used, this should be understood also to embrace "cooling lubricant" and "lubricant". Correspondingly, the described means for guiding the coolant are intended also to be suitable for the guidance of a "cooling lubricant" or "lubricant".

BRIEF DESCRIPTION OF THE DRAWINGS

Further features and advantages of the disclosure emerge from the description below of a plurality of preferred exemplary embodiments with reference to the drawings, in which:

FIG. 1A shows a perspective side view, FIG. 1B shows a perspective front view, FIG. 1C shows a first side view, FIG. 1D shows a top view, FIG. 1E shows a sectional representation along B-B, FIG. 1F shows a sectional representation along A-A, FIG. 1G shows a second side view, and FIG. 1H shows a sectional representation along C-C;

FIG. 2A shows a perspective view, FIG. 2B shows a cross-sectional representation of the head region, FIG. 2C shows, a top view, and FIG. 2D shows a front view;

FIGS. 3A-3B show various views of a third embodiment of the presented tool, where FIG. 3A shows a perspective side view and FIG. 3B shows a perspective front view;

FIGS. 4A-4B show various views of a fourth embodiment of the presented tool, where FIG. 4A shows a perspective side view and FIG. 4B shows a perspective front view;

FIG. 5A shows a perspective side view and FIG. 5B shows a perspective front view;

FIG. 6A shows a perspective side view and FIG. 6B shows a perspective front view.

DESCRIPTION OF PREFERRED EMBODIMENTS

Figure 1A:
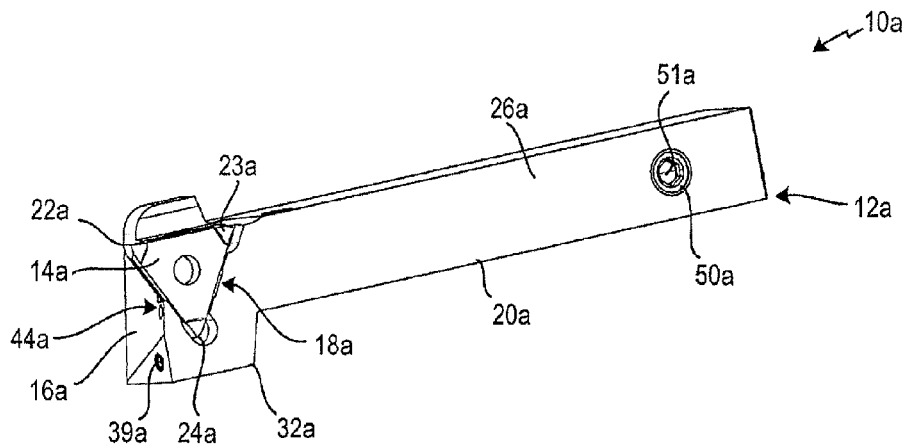
FIGS. 1A-1H show various views of a first embodiment of the presented tool, where
Figure 1B:
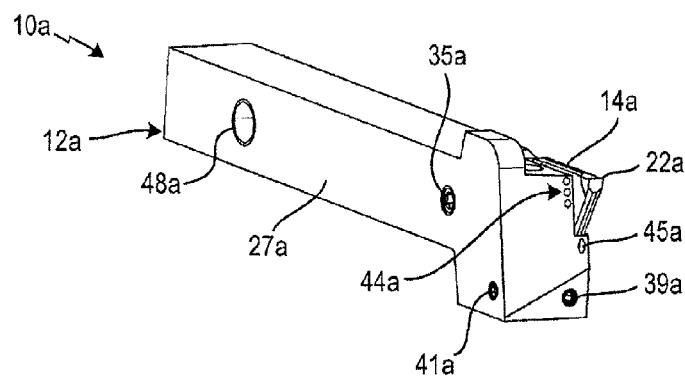
Figure 1C:
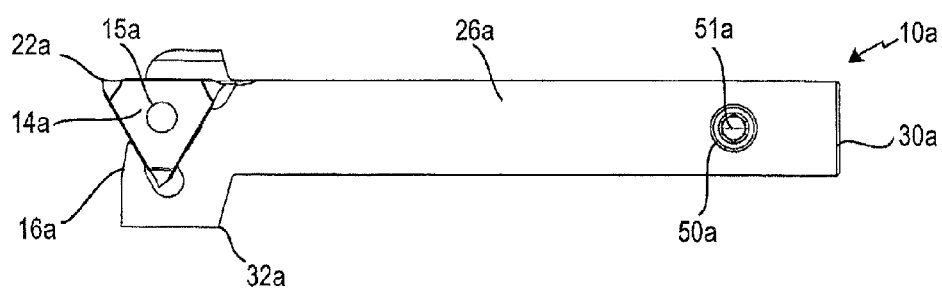
Figure 1D:
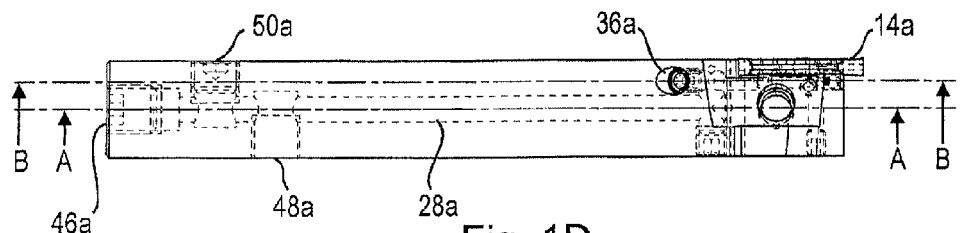
Figure 1E:
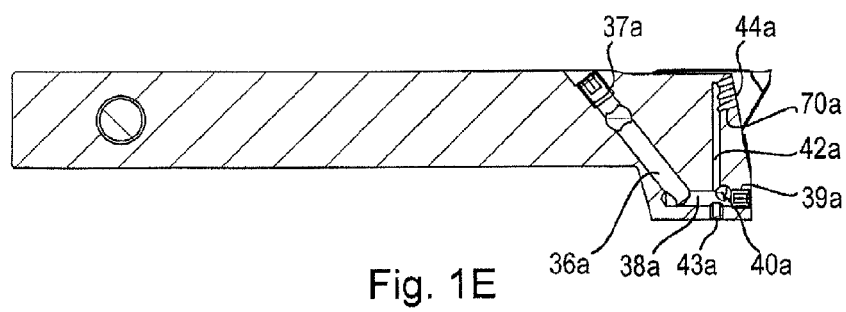
Figure 1F:
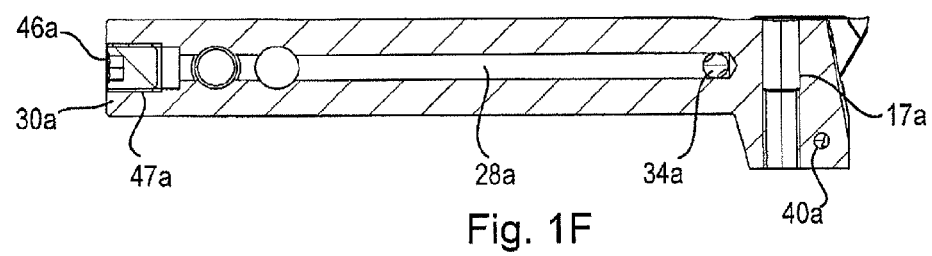
Figure 1G:
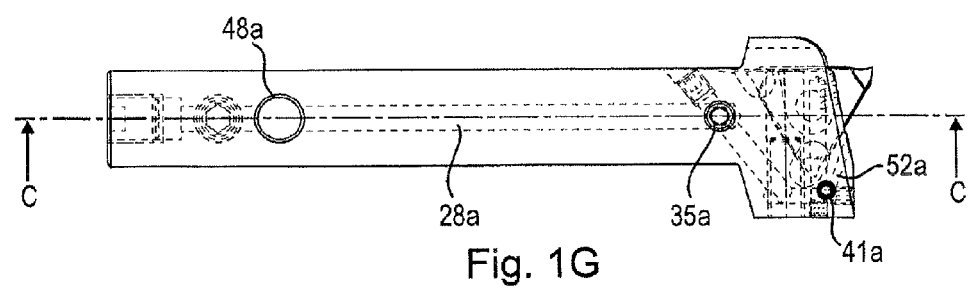
Figure 1H:
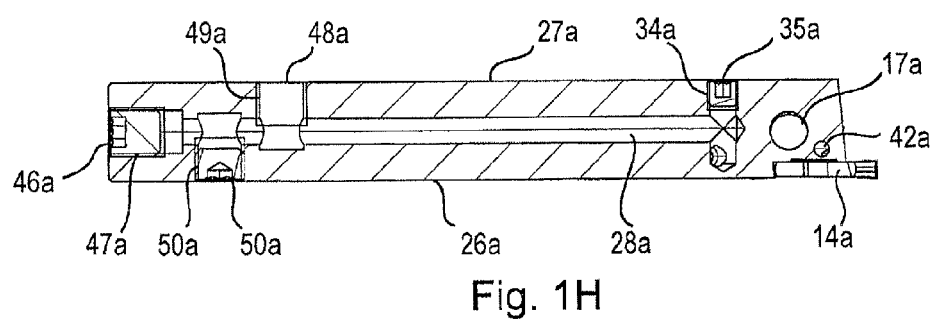

FIGS. 1A-1H show various views of a first embodiment of the presented tool 10a, namely a perspective side view (FIG. 1A), a perspective front view (FIG. 1B), a first side view (FIG. 1C), a top view (FIG. 1D), a sectional representation along B-B (FIG. 1E), a sectional representation along A-A (FIG. 1F), a second side view (FIG. 1G), and a sectional representation along C-C (FIG. 1H). The tool 10a basically has a holder 12a and a cutting insert 14a, which is disposed in the region of the workpiece-side end face 16a of the holder 12a in a cutting insert receptacle 18a. The holder 12a is of bar-shaped configuration having a shank region 20a, which in the present case has a rectangular cross-section and is designed for reception in a holding unit (not shown), for example a machine tool. In this illustrative embodiment, the cutting insert 14a is configured as an indexable insert having three cutting edges or cutters 22a, 23a, 24a, wherein the active cutting edge 22a protrudes over the end face 16a of the holder 12a.

The cutting insert 14a is fastened to the holder 12a by means of a fastening element (not shown), for example by means of a clamping screw screwed into the holder into the threaded bore 15a and/or by means of a clamping claw which presses from above against the cutting insert and which is screwed to the holder 12a by means of a retaining screw screwed into the threaded bore 17a. The cutting insert receptacle 18a is attached to the side of the holder 12a such that the cutting insert 14a forms with the side face 26a a plane surface.

In order to supply the machining point and the active cutting edge 22a with coolant (for the cooling and/or lubrication) during a machine cutting operation, in the shank region 20a of the holder 12a is disposed a longitudinally extending central coolant bore 28a, which opens out outwardly onto that end face 30a of the holder 12a which is facing away from the workpiece. In the head region 32a of the holder 12a is provided a first connecting bore (transverse bore) 34a, which connects the coolant bore 28a to an obliquely running second connecting bore 36a. This connecting bore 36a is in turn connected to a third connecting bore 38a provided in the longitudinal direction in the head region 32a. The third connecting bore 38a is in turn connected to a fourth connecting bore (transverse bore) 40a, which runs transversely to the longitudinal direction through the head region 32a and opens out into a fifth connecting bore 42a. Finally, this fifth connecting bore 42a opens out, via a plurality of sixth connecting bores 70a, into a plurality of coolant outlets 44a.

In the shown illustrative embodiment, these coolant outlets 44a comprise three circularly configured discharge openings, which are situated alongside the cutting insert receptacle 18a and thus next to the cutting insert 14a in a common coolant discharge plane running parallel to the longitudinal direction of the holder 12a and parallel to the cutting insert plane (the cutting insert plane can here be regarded as a plane through the cutting insert, for example the paper sheet plane in FIG. 1C; the coolant discharge plane can here be regarded as a plane through the coolant discharge openings 44a, i.e. for example the paper sheet plane in FIG. 1E).

The coolant discharge openings 44a are here arranged such that the coolant, in the machine cutting operation, is discharged in the direction of the cutting insert 14a, in particular in the direction of the active cutter 22a or of the machining point. Unlike in known tools, the coolant is here not necessarily sprayed out with very great pressure, however, for instance in order to also obtain chip influencing, but rather the cooling or lubrication is effected by flooding of the machining point and of the active cutting edge 22a with a larger quantity of coolant, which, in the shown illustrative embodiment, is enabled by the greater number of coolant discharge openings 44a. This greater number is possible by virtue of the fact that the coolant discharge openings 44a are disposed alongside the cutting insert receptacle 18a, and not, as in known tools, in the cutting insert itself, where generally only one or two small discharge openings can be arranged.

It should at this point be mentioned that the shown configuration of the different bores for coolant guidance should be regarded as illustrative. The guidance of the bores can be formulated quite differently. Also the number, arrangement and configuration of the coolant discharge openings can be formulated differently. Further illustrative embodiments thereto are explicitly presented in further illustrative embodiments set out in greater detail below.

In the shown illustrative embodiment, the position of the various bores is chosen such that they can be produced as simply as possible. To the outside, the different bores are additionally sealed off with a closure element 35a, 37a, 39a, 41a, 43a. As the closure element can be used, for example, a simple screw, which is screwed, and where necessary bonded, into the respective, outward opening end of the associated bore, though other illustrative embodiments, for instance sealing plugs or bolts, and other fastening options for the closure elements, for instance by soldering, welding or shrinkage, are also, of course, conceivable.

In the shown illustrative embodiment, there are several options available for the coolant supply. The coolant bore 28a is, on the one hand, guided as far as the end face 30a facing away from the workpiece, where it has a first feed opening 46a. In that end region of the holder 12a which is facing away from the workpiece, the coolant bore 28a further has two lateral feed openings 48a, 50a on the opposite side faces 26a, 27a, in order to be able, according to the given conditions, to supply the coolant also from one of the opposite sides 26a, 27a. The various feed openings 46a, 48a, 50a are respectively likewise closed off by appropriate closure elements 47a, 49a, 51a when not in use.

As can be seen in FIGS. 1B and 1G, in addition to the coolant discharge openings 44a, a further coolant discharge opening 45a, which is supplied with coolant via a further connecting bore 52a, can additionally be provided directly beneath the cutting insert receptacle 18a.

Figure 2A:
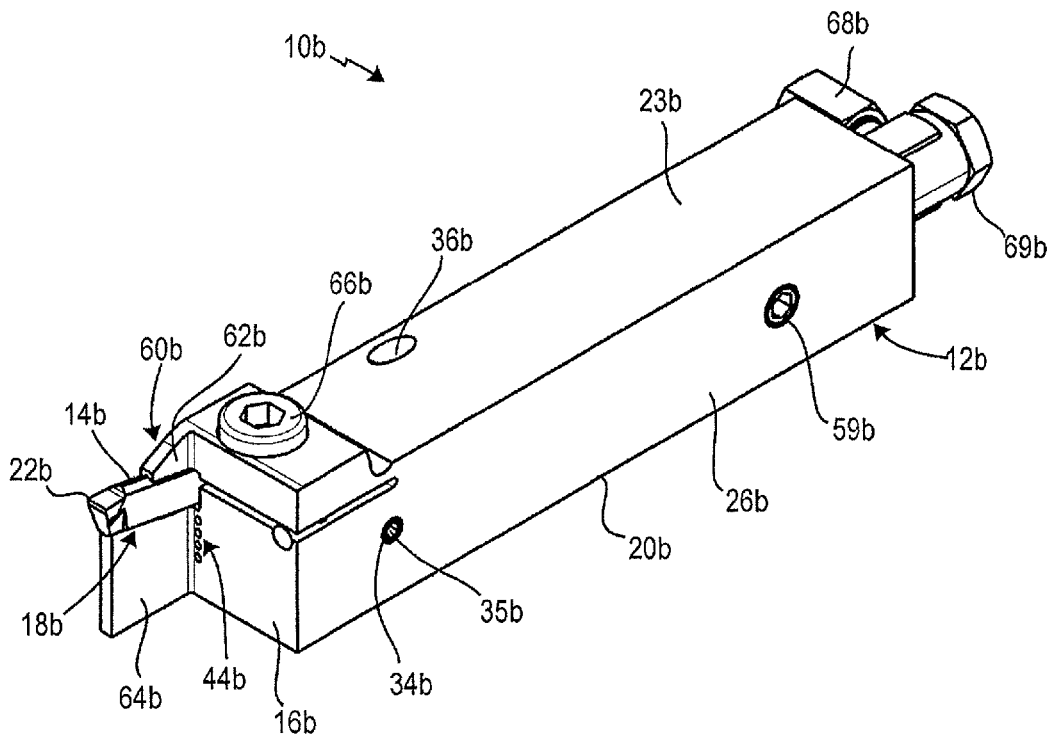
FIGS. 2A-2D show various views of a second embodiment of the presented tool, where
Figure 2B:
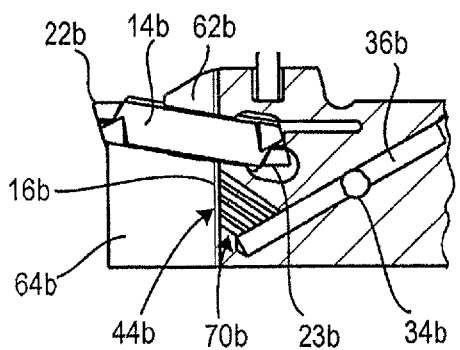
Figure 2C:
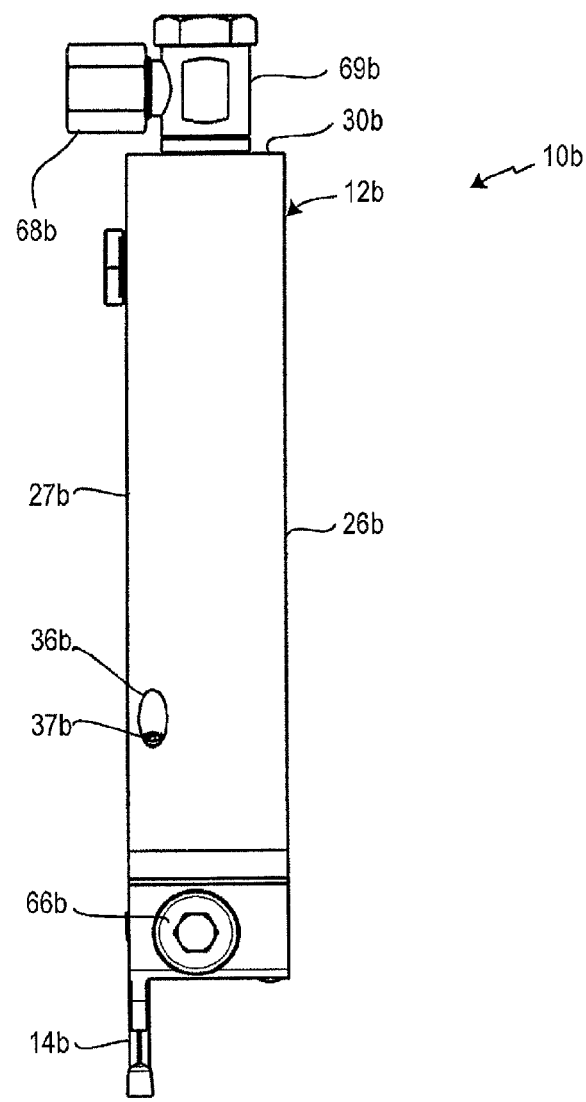
Figure 2D:
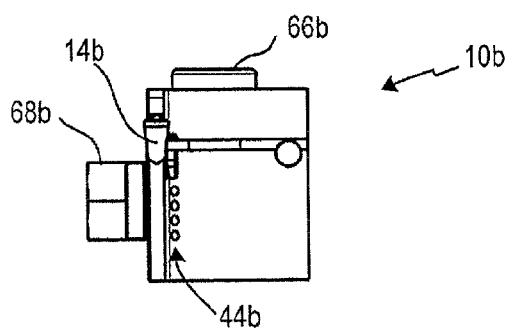
Figure 5A:
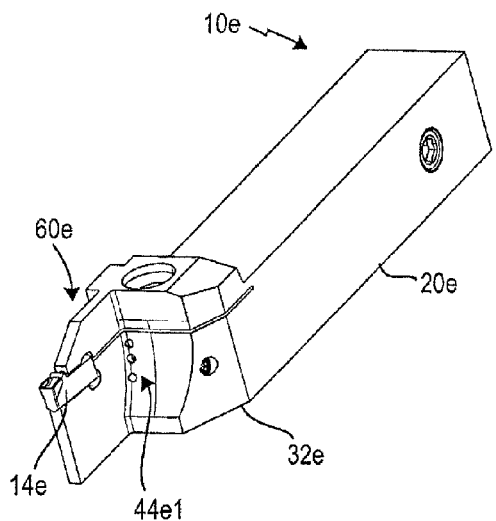
FIGS. 5A-5B show various views of a fifth embodiment of the presented tool, where
Figure 5B:
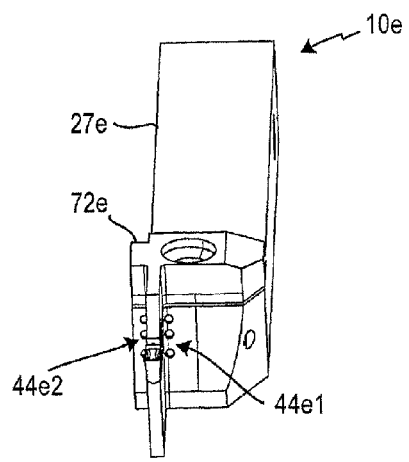
Figure 6A:
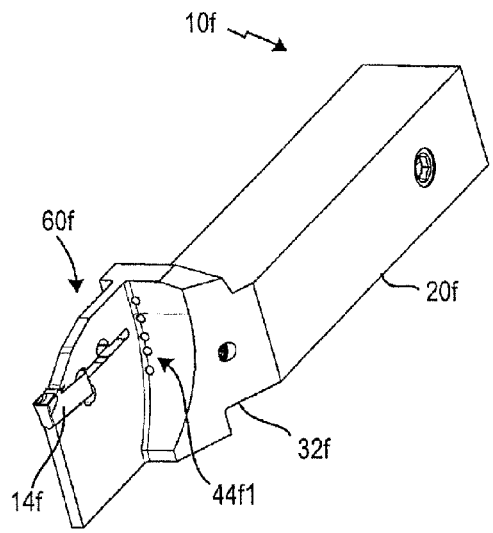
FIGS. 6A-6B show various views of a sixth embodiment of the presented tool, where
Figure 6B:
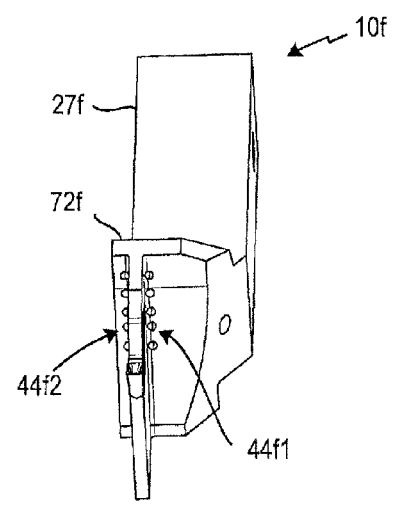

FIGS. 2A-2D show various views of a second embodiment of the presented tool 10b, namely a perspective view (FIG. 2A), a cross-sectional representation of the head region (FIG. 2B), a top view (FIG. 2C) and a front view (FIG. 2D). For basically same parts, the same numerals are used in the reference symbols, the letter "b" referring to the second embodiment and to any parts which may have been modified.

The holder 12b is likewise of bar-shaped configuration with a shank region 20b, but has on its workpiece-side end face 16b a clamping rib 60b, which is arranged protruding in the longitudinal direction of the holder 12b and which is substantially formed by two clamping jaws 62b, 64b, between which the cutting insert 14b is clampingly held. In this illustrative embodiment, the cutting insert 14b has two cutting edges 22b, 23b and, in known manner, is of bar-shaped configuration. For the clamping of the cutting insert 14b, the upper clamping jaw 62b is forced in the direction of the lower clamping jaw 64b by means of a clamping screw 66b. Such configurations of clamping holders are commonly known (for example from DE 101 32 721 C1) and shall therefore not be further described at this point.

In this embodiment, a first, obliquely running connecting bore 36b, which is connected to a coolant bore (not shown) running in the longitudinal direction of the holder, is provided in the front region of the holder 12b for guidance of the coolant. This coolant bore opens out outwardly onto the end face 30b facing away from the workpiece and is fed therewith coolant, for example via appropriate feeding elements 68b, 70b. Furthermore, the coolant bore can also be fed via a lateral feed 50b on the side face 26b.

For the connection of the first connecting bore 36b and the coolant bore, a second connecting bore (transverse bore) 34b is also provided, similarly as in the first illustrative embodiment. In the direction of the workpiece-side end face 16b, the first connecting bore 36b merges into discharge bores 70b, which finally, on the workpiece-side end face 16b, open out into a plurality of (in the present case four) discharge openings 44b.

In this illustrative embodiment also, the coolant discharge openings 44b are disposed alongside the cutting insert receptacle 18b formed by the clamping rib 60b with the two clamping jaws 62b, 64b and are oriented such that the coolant is discharged in the direction of the cutting insert 14b, in particular in the direction of the active cutting edge 22b. In this illustrative embodiment, too, the different bores 34b, 36b are additionally outwardly sealed off by appropriate closure means 35b, 37b.

Further embodiments of the presented tool 10c, 10d, 10e, 10f are shown in FIGS. 3 to 6, wherein respectively a perspective side view (FIGS. 3A, 4A, 5A, 6A) and a perspective front view (FIGS. 3B, 4B, 5B, 6B) are shown. In these embodiments, the tool respectively has a clamping rib 60c, 60d, 60e, 60f, which in a similar manner to the clamping rib 60b in that embodiment of the tool 10b which is shown in FIG. 2, clampingly holds the (respectively identical) cutting insert 14c.

In those embodiments of the tool 10c, 10d which are shown in FIGS. 3A-3B and 4A-4B, the clamping rib 60c, 60d is respectively disposed on the side of the workpiece-side end face 16c, 16d, said end face, in these embodiments, being of arched configuration, and terminates flush with the respective side face 27c, 27d of the respective shank region 20c, 20d. Alongside the clamping rib 60c, 60d are here respectively disposed, on the workpiece-side end face 16c, 16d, a plurality of coolant discharge openings 44c, 44d, wherein, in that embodiment of the tool 10d which is shown in FIGS. 4A-4B, the number of discharge openings is greater and the uppermost discharge opening closer to the upper top surface 33d of the head region 32d than in that embodiment of the tool 10c which is shown in FIG. 3. Preferably in dependence on the cutting edge width, the one or other variant of the cutting tool is used. The cross sections of the total number of discharge openings preferably roughly correspond in total to the cross section of the coolant bore through the shank region.

In those embodiments of the tool 10e, 10f which are shown in FIGS. 5A-5B and 6A-6B, the head region 32e, 32f is respectively of widened configuration, so that the clamping rib 60e, 60f does not terminate flush with the respective side face 27e, 27f of the respective shank region 20e, 20f, but rather a step 72e, 72f of the widened head region 32e, 32f protrudes therebetween. In these embodiments of the tool 10e, 10f, two groups of coolant discharge openings 44e1, 44e2 and 44f1, 44f2 are respectively disposed alongside the clamping rib 60e, 60f, namely respectively one group per side. The widened projection 72e, 72f in the head region is in these embodiments thus used to provide there a second group of discharge openings 44e2, 44f2, so that, from both sides, coolant can be discharged in the direction of the active cutting edge of the cutting insert 14e, 14f or in the direction of the machining point in order to achieve there a still better flooding, and thus cooling and/or lubrication. Of course, the number, arrangement and configuration of the individual coolant discharge openings of the two groups does not here have to be identical; equally, the discharge openings can also in principle be configured differently, nor do they have to lie all in one plane, as in the shown illustrative embodiments.

In that embodiment of the tool 10c which is shown in FIGS. 3A-3B, it should also be pointed out that in this embodiment is also guided through the upper clamping jaw 62c a further coolant channel to a further coolant discharge opening 74c, which lies in the front end region of the upper clamping jaw and through which coolant is likewise discharged in the direction of the active cutting edge. This discharge opening 74c can here be configured such that the coolant is discharged there with an increased pressure and, where necessary, effects chip influencing. Additionally or alternatively, a coolant bore having a discharge opening in the front end region can also respectively be arranged through the lower clamping jaw.

Figure 7:
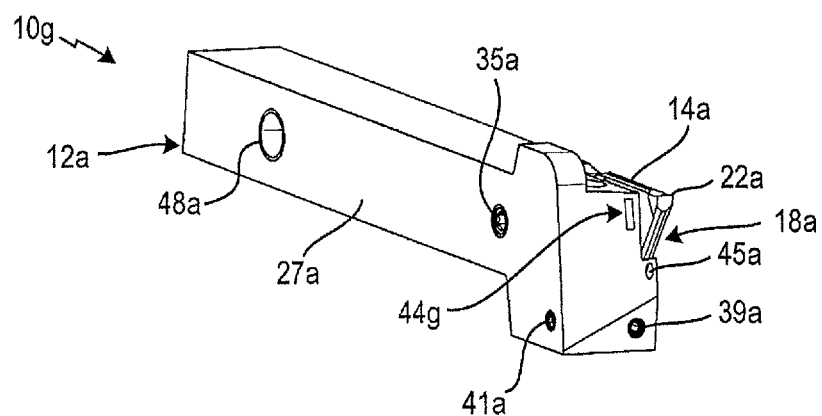
FIG. 7 shows a view of a seventh embodiment of the presented tool.

A further embodiment of the presented tool 10g is shown in FIG. 7. In this embodiment, a slot-shaped discharge opening 44g is disposed alongside the cutting insert receptacle 18a and next to the cutting insert 14a. Of course, a plurality of slot-shaped discharge openings, or both circular and slot-shaped discharge openings, can also be provided, and such slot-shaped discharge openings can also be used in other embodiments of the presented tool.

Furthermore, the provided at least one discharge opening arranged alongside the cutting insert receptacle can also be provided in tools in which the (plate-like) cutting insert is not disposed in the longitudinal direction of the shank region but transversely thereto, for example twisted through 90° relative to the longitudinal direction. The guidance of the coolant through the holder is then configured correspondingly in order to transport the coolant to the at least one discharge opening.

In further configurations, it is provided that the coolant strikes the side of the cutting insert.

Self-evidently, the shown embodiments should be regarded merely as illustrative. The individual features of the shown embodiments can also be realized in optional other combinations in further embodiments of the presented tool. This applies, in particular, in relation to the number, arrangement and configuration of the coolant discharge openings, as well as of the different bores within the tool from one or more feed openings to the at least one coolant discharge opening. Furthermore, the presented configuration and arrangement of the coolant discharge openings can also be used in other tool types.

What is claimed is:
1. A tool for machining workpiece, comprising:
   a cutting insert with at least one cutting edge; and
   a holder,
   wherein the holder comprises:
      a shank,
      wherein the shank extends along a longitudinal direction;
      a clamping rib which protrudes from a workpiece-side end face of the shank in the longitudinal direction,
      wherein the clamping rib is configured thinner than the shank,
      wherein the clamping rib has an upper clamping jaw and a lower clamping jaw, wherein the cutting insert is clamped between the upper clamping jaw and the lower clamping jaw; and
a coolant bore,
wherein the coolant bore opens out into a plurality of coolant outlets that are arranged on the workpiece-side end face of the shank, alongside the clamping rib, and are oriented such that coolant is discharged towards the cutting insert,
wherein at least some of the coolant outlets of the plurality of coolant outlets lie in a coolant outlet plane, which runs parallel to and is offset from a cutting insert plane running through the clamping rib,
wherein the coolant outlet plane and the cutting insert plane run parallel to the longitudinal direction of the shank, and
wherein the plurality of coolant outlets are arranged on the workpiece-side end face of the shank, alongside the clamping rib.

2. The tool as claimed in claim 1,
wherein the cutting insert has a shape of a plate.

3. The tool as claimed in claim 1,
wherein the clamping rib is arranged on a marginal region of the workpiece-side end face of the shank region, and
wherein a side face of the shank is aligned with a side face of the clamping rib.

4. The tool as claimed in claim 1,
wherein the coolant outlets of the plurality of coolant outlets are arranged only alongside one side of the clamping rib.

5. The tool as claimed in claim 1,
wherein a first portion of the coolant outlets of the plurality of coolant outlets is arranged alongside a first side of the clamping rib, and
wherein a second portion of the coolant outlets of the plurality of coolant outlets is arranged alongside a second side of the clamping rib.

6. The tool as claimed in claim 1,
wherein at least one further coolant outlet is arranged in at least one of the upper clamping jaw and the lower clamping jaw.

7. The tool as claimed in claim 6,
wherein the at least one further coolant outlet is arranged in the upper clamping jaw.

8. The tool as claimed in claim 1,
wherein the coolant bore extends in the longitudinal direction within the holder.

9. A tool for machining a workpiece, comprising:
a cutting insert with at least one cutting edge; and
a holder,
wherein the holder comprises:
 a shank,
 wherein the shank extends along a longitudinal direction;
 a cutting insert receptacle,
 wherein the cutting insert receptacle is arranged in a region of a workpiece-side end face of the shank, and
 wherein the cutting insert is disposed in the cutting insert receptacle; and
 a coolant bore,
 wherein the coolant bore opens out into a plurality of coolant outlets that are arranged on the workpiece-side end face of the shank, alongside the cutting insert receptacle, and are oriented such that coolant is discharged towards the cutting insert,
 wherein at least some of the coolant outlets of the plurality of coolant outlets lie in a coolant outlet plane, which runs parallel to and is offset from a cutting insert plane running through the cutting insert receptacle,
 wherein the coolant outlet plane and the cutting insert plane run parallel to the longitudinal direction of the shank,
 wherein a transverse bore and at least one further connecting bore are arranged in a region close to the workpiece-side end face of the shank,
 wherein the transverse bore connects the coolant bore and the coolant outlets of the plurality of coolant outlets with each other,
 wherein the transverse bore runs transversely to the longitudinal direction of the shank and intersects the coolant bore, and
 wherein the at least one further connecting bore runs offset from the coolant bore in the longitudinal direction or obliquely to the longitudinal direction.

10. A tool for machining a workpiece, comprising:
a cutting insert with at least one cutting edge; and
a holder,
wherein the holder comprises:
 a shank,
 wherein the shank extends along a longitudinal direction;
 a cutting insert receptacle,
 wherein the cutting insert receptacle is arranged in a region of a workpiece-side end face of the shank, and
 wherein the cutting insert is disposed in the cutting insert receptacle;
 a coolant bore,
 wherein the coolant bore opens out into at least one coolant outlet that is arranged on the workpiece-side end face of the shank, alongside the cutting insert receptacle, and is oriented such that coolant is discharged towards the cutting insert; and
 a clamping rib which protrudes from the workpiece-side end face of the shank in the longitudinal direction,
 wherein the clamping rib is configured thinner than the shank,
 wherein the clamping rib has two clamping jaws between which the cutting insert is clamped,
 wherein the shank has a projection in the region of the workpiece-side end face such that the projection comprises a portion of the workpiece-side end face, and
 wherein the at least one coolant outlet is arranged on the portion of the workpiece-side end face corresponding to the projection.

11. The tool as claimed in claim 10,
wherein the cutting insert has a plate-like configuration, and
wherein the at least one coolant outlet lies in a coolant outlet plane, which runs parallel to and is offset from a cutting insert plane running through the cutting insert receptacle.

12. The tool as claimed in claim 11,
wherein the coolant outlet plane and the cutting insert plane run parallel to the longitudinal direction of the shank.

13. The tool as claimed in claim 11,
wherein the coolant outlet plane and the cutting insert plane run transversely or obliquely to the longitudinal direction of the shank.

14. The tool as claimed in claim 10,
wherein the at least one coolant outlet is at least two coolant outlets.

15. The tool as claimed in claim 14,
wherein a first portion of the at least two coolant outlets is arranged alongside a first side of the cutting insert receptacle, and
wherein a second portion of the at least two coolant outlets is arranged alongside a second side of the cutting insert receptacle.

\* \* \* \* \*